(12) United States Patent
Androulaki et al.

(10) Patent No.: US 11,362,805 B2
(45) Date of Patent: Jun. 14, 2022

(54) DATABASE ENCRYPTION LAYER

(71) Applicant: International Business Machines Corporation, Armonk, NY (US)

(72) Inventors: Elli Androulaki, Zürich (CH); Angelo De Caro, Zürich (CH); Alessandro Sorniotti, Rueschlikon (CH); Tamas Visegrady, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 570 days.

(21) Appl. No.: 16/178,138

(22) Filed: Nov. 1, 2018

(65) Prior Publication Data

US 2020/0145189 A1 May 7, 2020

(51) Int. Cl.
| | |
|---|---|
| *H04L 29/06* | (2006.01) |
| *H04L 9/06* | (2006.01) |
| *H04L 9/14* | (2006.01) |
| *G06F 9/54* | (2006.01) |
| *G06F 21/60* | (2013.01) |
| *G06F 16/23* | (2019.01) |

(52) U.S. Cl.
CPC ............. *H04L 9/0637* (2013.01); *G06F 9/54* (2013.01); *G06F 16/2379* (2019.01); *G06F 21/602* (2013.01); *H04L 9/14* (2013.01); *H04L 2209/38* (2013.01)

(58) Field of Classification Search
CPC ..... H04L 9/0637; H04L 9/14; H04L 2209/38; H04L 63/123; H04L 63/0428; H04L 9/0861; H04L 9/0822; H04L 2209/42; H04L 9/3239; G06F 16/2379; G06F 9/54; G06F 21/602; G06F 21/6227; G06F 9/547
See application file for complete search history.

(56) References Cited

U.S. PATENT DOCUMENTS

| | | | |
|---|---|---|---|
| 11,063,745 | B1 * | 7/2021 | Du ........................ H04L 9/3247 |
| 2016/0283920 | A1 | 9/2016 | Fisher et al. |
| 2017/0111175 | A1 | 4/2017 | Oberhauser et al. |
| 2017/0149819 | A1 * | 5/2017 | Androulaki ........... H04L 9/3236 |
| 2017/0155515 | A1 * | 6/2017 | Androulaki ............. H04L 9/008 |
| 2017/0177898 | A1 | 6/2017 | Dillenberger |
| 2017/0331624 | A1 | 11/2017 | Samid |

(Continued)

FOREIGN PATENT DOCUMENTS

CN 102752101 A 10/2012

OTHER PUBLICATIONS

Ateniese et al. "Improved proxy re-encryption schemes with applications to secure distributed storage." ACM Transactions on Information and System Security (TISSEC) 9.1 (2006): 1-30. (Related).

(Continued)

*Primary Examiner* — Trong H Nguyen

(57) ABSTRACT

An example operation may include one or more of receiving, by one or more endorser nodes of a blockchain network, an invoke chaincode transaction proposal, executing chaincode, encrypting, by an application programming interface between the chaincode and a shared ledger, blockchain state to the shared ledger, decrypting blockchain state from the shared ledger, endorsing, by the one or more endorser nodes, one or more results from executing the chaincode, and creating a blockchain transaction from the one or more endorsed results.

20 Claims, 15 Drawing Sheets

(56) References Cited

U.S. PATENT DOCUMENTS

| | | | |
|---|---|---|---|
| 2018/0005186 A1* | 1/2018 | Hunn | G06F 40/103 |
| 2019/0347653 A1* | 11/2019 | Lu | H04L 9/3239 |
| 2020/0084027 A1* | 3/2020 | Duchon | H04L 9/0825 |
| 2020/0134613 A1* | 4/2020 | Jiang | G06F 16/1824 |
| 2021/0385084 A1* | 12/2021 | Riveret | H04L 9/32 |

OTHER PUBLICATIONS

Golle, et al. "Universal re-encryption for mixnets." Cryptographers' Track at the RSA Conference. Springer, Berlin, Heidelberg, 2004. (Related).

Kiayias et al., "Delegatable Pseudorandom Functions and Applications.," CCS'13, Nov. 4-8, 2013, Berlin, Germany. (Related).

Wright et al., . "Decentralized blockchain technology and the rise of lex cryptographia." papers.ssm.com (2015). (Related).

Zyskind et al., "Decentralizing privacy: Using blockchain to protect personal data." Security and Privacy Workshops (SPW), 2015 IEEE. IEEE, 2015. (Related).

\* cited by examiner

DATABASE ENCRYPTION LAYER

TECHNICAL FIELD

This application generally relates to a database storage system, and more particularly, to a database encryption layer.

BACKGROUND

A centralized database stores and maintains data in one single database (e.g., database server) at one location. This location is often a central computer, for example, a desktop central processing unit (CPU), a server CPU, or a mainframe computer. Information stored on a centralized database is typically accessible from multiple different points. Multiple users or client workstations can work simultaneously on the centralized database, for example, based on a client/server configuration. A centralized database is easy to manage, maintain, and control, especially for purposes of security because of its single location. Within a centralized database, data redundancy is minimized as a single storing place of all data also implies that a given set of data only has one primary record.

However, a centralized database suffers from significant drawbacks. For example, a centralized database has a single point of failure. In particular, if there are no fault-tolerance considerations and a hardware failure occurs (for example a hardware, firmware, and/or a software failure), all data within the database is lost and work of all users is interrupted. In addition, centralized databases are highly dependent on network connectivity. As a result, the slower the connection, the amount of time needed for each database access is increased. Another drawback is the occurrence of bottlenecks when a centralized database experiences high traffic due to a single location. Furthermore, a centralized database provides limited access to data because only one copy of the data is maintained by the database. As a result, multiple devices cannot access the same piece of data at the same time without creating significant problems or risk overwriting stored data. Furthermore, because a database storage system has minimal to no data redundancy, data that is unexpectedly lost is very difficult to retrieve other than through manual operation from back-up storage.

Conventionally, a centralized database is limited by an inability to provide encryption services during an endorsement phase of fabric transactions. As such, what is needed is a solution to overcome these significant drawbacks.

SUMMARY

One example embodiment provides a system that includes a blockchain network, which includes a blockchain client and one or more endorser nodes. The blockchain client is configured to perform one or more of create an invoke chaincode transaction proposal and create a blockchain transaction from one or more endorsed results. The one or more endorser nodes are configured to perform one or more of receive the invoke chaincode transaction proposal, execute chaincode that corresponds to the invoke chaincode transaction proposal, encrypt, by an application program interface between the chaincode and a shared ledger, blockchain state to the shared ledger, decrypt blockchain state from the shared ledger, and endorse, by the one or more endorser nodes, one or more results from the executed chaincode.

Another example embodiment provides a method that includes one or more of receiving, by one or more endorser nodes of a blockchain network, an invoke chaincode transaction proposal, executing chaincode, encrypting, by an application programming interface between the chaincode and a shared ledger, blockchain state to the shared ledger, decrypting blockchain state from the shared ledger, endorsing, by the one or more endorser nodes, one or more results from executing the chaincode, and creating a blockchain transaction from the one or more endorsed results.

A further example embodiment provides a non-transitory computer readable medium comprising instructions, that when read by a processor, cause the processor to perform one or more of receiving, by one or more endorser nodes of a blockchain network, an invoke chaincode transaction proposal, executing chaincode, encrypting, by an application programming interface between the chaincode and a shared ledger, blockchain state to the shared ledger, decrypting blockchain state from the shared ledger, endorsing, by the one or more endorser nodes, one or more results from executing the chaincode, and creating a blockchain transaction from the one or more endorsed results.

DETAILED DESCRIPTION

Figure 1A:
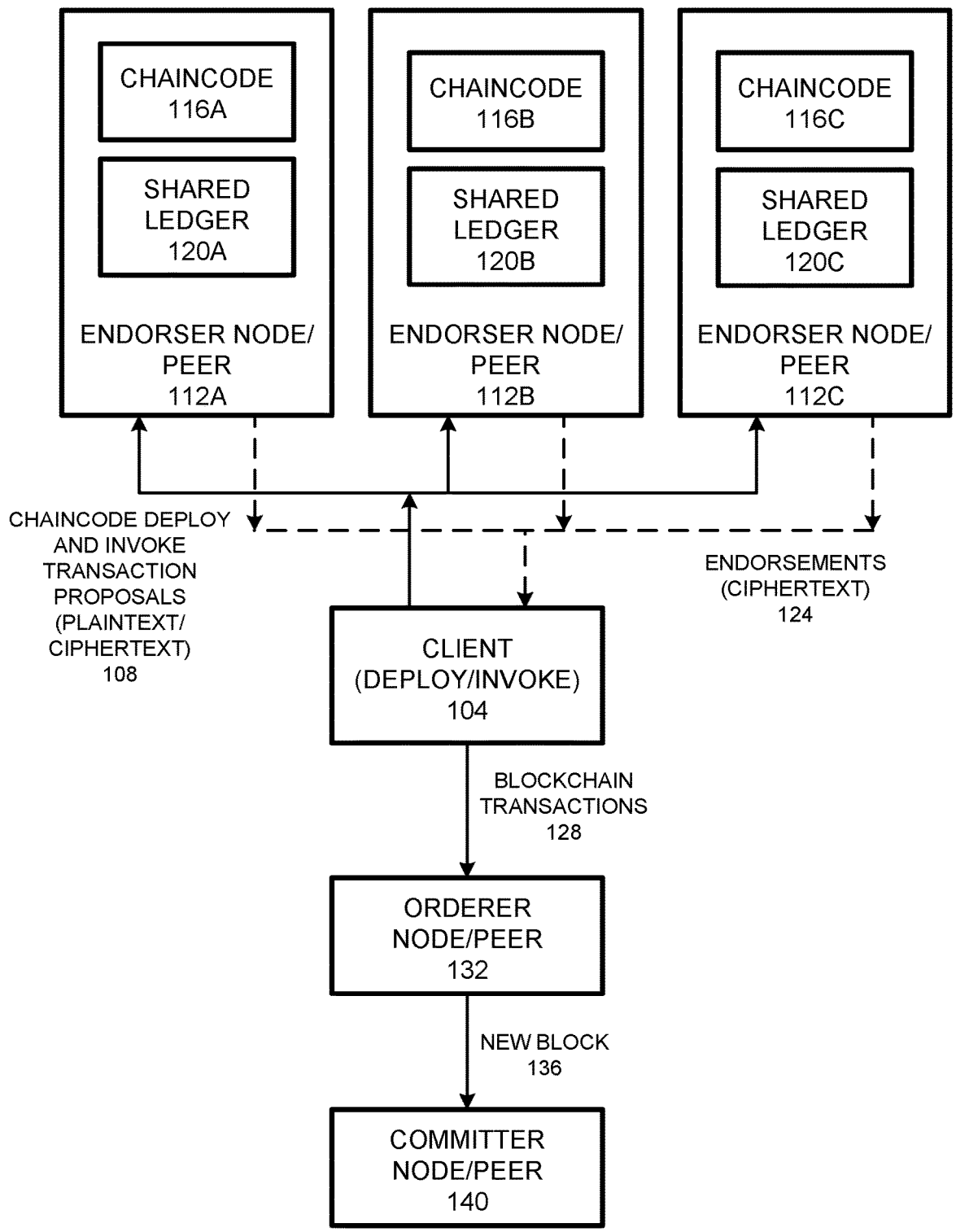
FIG. 1A illustrates a network diagram of a system including a database, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide methods, systems, components, non-transitory computer readable media, devices, and/or networks, which provide database encryption layers.

A decentralized database is a distributed storage system which includes multiple nodes that communicate with each other. A blockchain is an example of a decentralized database which includes an append-only immutable data structure resembling a distributed ledger capable of maintaining records between mutually untrusted parties. The untrusted parties are referred to herein as peers or peer nodes. Each peer maintains a copy of the database records and no single peer can modify the database records without a consensus being reached among the distributed peers. For example, the peers may execute a consensus protocol to validate blockchain transactions, group the storage transactions into blocks, and build a hash chain over the blocks. This process forms the ledger by ordering the storage transactions, as is necessary, for consistency. In a public or permission-less blockchain, anyone can participate without a specific identity. Public blockchains often involve native cryptocurrency and use consensus based on various protocols such as Proof of Work (PoW). On the other hand, a permissioned blockchain database provides a system which can secure interactions among a group of entities which share a common goal but which do not fully trust one another, such as businesses that exchange funds, goods, information, and the like.

A blockchain operates arbitrary, programmable logic, tailored to a decentralized storage scheme and referred to as "smart contracts" or "chaincodes". In some cases, specialized chaincodes may exist for management functions and parameters which are referred to as system chaincode. Smart contracts are trusted distributed applications which leverage tamper-proof properties of the blockchain database and an underlying agreement between nodes which is referred to as an endorsement or endorsement policy. In general, blockchain transactions typically must be "endorsed" before being committed to the blockchain while transactions which are not endorsed are disregarded. A typical endorsement policy is attached to each chaincode to specify endorsers for a transaction in the form of a set of peer nodes that are necessary for endorsement. When a client sends the transaction to the peers specified in the endorsement policy, the transaction is executed to validate the transaction. After validation, the transactions enter an ordering phase in which a consensus protocol is used to produce an ordered sequence of endorsed transactions grouped into blocks.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation proposal to an endorser (e.g., peer), and broadcasts transactions to an ordering service (e.g., ordering node). Another type of node is a peer node which can receive client submitted transactions, commit the transactions and maintain a state and a copy of the ledger of blockchain transactions. Peers can also have the role of an endorser, although it is not a requirement. An ordering-service-node or orderer is a node running the consensus for all nodes, and which implements a delivery guarantee, such as a broadcast to each of the peer nodes in the system when committing transactions and modifying a world state of the blockchain, which is another name for the initial blockchain transaction which normally includes control and setup information.

A ledger is a sequenced, tamper-resistant record of all state transitions of a blockchain. State transitions may result from chaincode invocations (i.e., transactions) submitted by participating parties (e.g., client nodes). A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain. There is typically one ledger per channel. Each peer node maintains a copy of the ledger for each channel of which they are a member.

A chain is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Because the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

Some benefits of the instant solutions described and depicted herein include data confidentiality. The present application solves a technical problem of offering confidentiality of data that are stored on a blockchain. The solution preferably relates to Hyperledger Fabric platforms, and allows for client applications to be assured that the data of their chaincodes are encrypted prior to being added to shared ledgers; the mechanism leverages standard encryption techniques that are orchestrated completely at the application layer, requiring only minimal changes to run within the Fabric platform.

Blockchain is different from a traditional database in that blockchain is not a central storage but rather a decentralized, immutable, and secure storage, where nodes must share in changes to records in the storage. Some properties that are inherent in blockchain and which help implement the blockchain include, but are not limited to, an immutable ledger, smart contracts, security, privacy, decentralization, consensus, endorsement, accessibility, and the like, which are further described herein. According to various aspects, the data confidentiality is implemented due to smart contracts/chaincode, security, private/hidden data, endorsement, and accessibility, which are inherent and unique to blockchain. In particular, confidential smart contracts/chaincode are deployed and invoked by blockchain clients. Only selected and trusted endorser nodes are involved in the processes. Non-involved endorser nodes, orderers, and committers present within the blockchain network only are able to access encrypted data and blockchain state, which enhances security. Although the encrypted blockchain transactions are stored to the shared ledgers, because non-trusted nodes or peers can only access encrypted data, the encrypted data is effectively private or hidden to the non-privileged nodes. Invoke transaction proposals are endorsed by the trusted endorser nodes which are able to convert the encrypted arguments and blockchain state into a decrypted form for improved accessibility.

One of the benefits of the example embodiments is that it improves the functionality of a computing system by improving security with confidential smart contracts or chaincode. Through the blockchain system described herein, a computing system can perform improved security functionality by selectively encrypting chaincode arguments and blockchain state. Because of blockchain, only selected endorsers participate in processing plaintext data, thus limiting exposure of plaintext data to only trusted nodes or peers. Additionally, these improvements are provided without altering the existing fabric structures of blockchain networks or altering existing application programming interfaces.

The example embodiments provide numerous benefits over a traditional database. For example, through the blockchain the embodiments provide improved confidentiality of data that is stored on a blockchain. Meanwhile, a traditional database could not be used to implement the example embodiments because traditional databases do not support transaction endorsement. Accordingly, the example embodiments provide for a specific solution to a problem in the arts/field of data privacy within permissioned blockchain networks.

The example embodiments also change how data may be stored within a block structure of the blockchain. For example, arguments and blockchain state from a confidential chaincode may be encrypted prior to being stored within a shared ledger. By storing encrypted data within data blocks of a blockchain, the encrypted data may be appended to an immutable ledger through a hash-linked chain of blocks. In some embodiments, the data block may be different than a traditional data block by including selected encrypted data that is associated with a confidential smart contract or chaincode that is within a traditional block structure of a blockchain.

FIG. 1A illustrates a network diagram of a system including a database, according to example embodiments. Referring to FIG. 1A, the network 100 includes a blockchain client 104 and various nodes or peers 112, 132, 140. The network 100 may be either a public or a permissioned blockchain network, but in the preferred embodiment is a permissioned blockchain network such as a Hyperledger Fabric (HLF) blockchain network 100. In blockchain networks 100, the same encryption techniques described herein may be applied to other general blockchain systems that have a key-value representation of their state.

The blockchain client 104 generates chaincode deploy and invoke transaction proposals 108 to one or more endorser nodes or peers 112. In one embodiment, the transaction proposals 108 include plaintext, or unencrypted arguments. In another embodiment, the transaction proposals include cyphertext, or encrypted arguments. When the transaction proposals 108 include cyphertext, a transient field in the transaction proposals 108 includes key material to allow the chaincode 116 to process the transaction proposals 108. Key material includes the key used for encrypting/decrypting chaincode state that is to be stored to, or retrieved from, the shared ledger 120, respectively.

The transaction proposals 108 are required in order to distribute and use a new confidential chaincode 116 within the blockchain network 100. Each of the endorser nodes or peers 112, identified in FIG. 1A as endorser node or peer 112A, endorser node or peer 112B, and endorser node or peer 112C, individually endorses and signs the transaction proposals 108. Endorsed transaction proposals 108 include an output of chaincode simulation, a reference to a corresponding transaction proposal 108, and the endorser's signature. The endorsed and signed transaction proposals 108 are returned to the blockchain client 104 as endorsements 124. The endorsements 124 are provided to the blockchain client 104 as cyphertext, so that any eavesdropping entities or nodes/peers not involved with deploying/invoking the confidential chaincode 116 can access or tamper with the endorsements 124.

In the preferred embodiment, the present application utilizes hierarchical encryption. A master key is used to derive other keys that are used in turn to derive other keys—eventually arriving to keys that encrypt data. This has the advantage that if a data key is compromised, not all the data needs to be re-encrypted; only the data encrypted with a compromised key and its sibling path in the key-tree. A master key is used to generate keys that are used to encrypt data using some additional information as input (e.g., through a key derivation process). The master key can be a secret symmetric key (only private) or a key-pair in which case the Public Key (PK) is used for the encryption and Secret Key (SK) is used for decryption.

Key derivation is a process through which one can derive one key from another. So key derivation with Key K and number R1 can produce K1, and with key K and number R2 can produce key K2. One who has access to the data that are encrypted with K1, and K2, only needs to store K (e.g., as usually R1 and R2 are public). But at the same time the data owner can disseminate K1, K2 to different user subset to enforce different access rights to different data sets.

The blockchain network 100 may include any number, but at least one, of endorser nodes or peers 112. Each of the endorser nodes or peers 112 includes the chaincode 116 and a copy of the shared ledger 120 for the blockchain. FIG. 1A shows endorser node or peer 112A including chaincode 116A and shared ledger 120A, endorser node or peer 112B including chaincode 116B and shared ledger 120B, and endorser node or peer 112C including chaincode 116C and shared ledger 120C.

Once the blockchain client 104 has received endorsements 124 from all endorser nodes or peers 112 such that the endorsement policy associated with the invoked chaincode is satisfied, the blockchain client 104 creates a blockchain transaction 128 and sends the blockchain transaction 128 to an orderer node or peer 132. The orderer node or peer 132 compiles a predetermined number of blockchain transactions 128 into a new block 136. The orderer node or peer 132 then transfers the new block 136 to a committer node or peer 140, which commits or adds the new block 136 to the blockchain. The new block is then stored in shared ledgers 120 of the blockchain network 100.

In conventional fabric-based blockchain networks not involving encryption/decryption, data that allows a user to invoke a chaincode (transaction proposal) 116 arrives in plaintext to endorser nodes or peers 112, who simulate the execution of the chaincode 116, produce the simulated results, which they sign and return to the blockchain client 104 in the form of an endorsement 124. The blockchain client 104 combines the endorsements together into a transaction 128 that it submits to the ordering service 132, which then broadcasts to the committing peers 140.

Figure 1B:
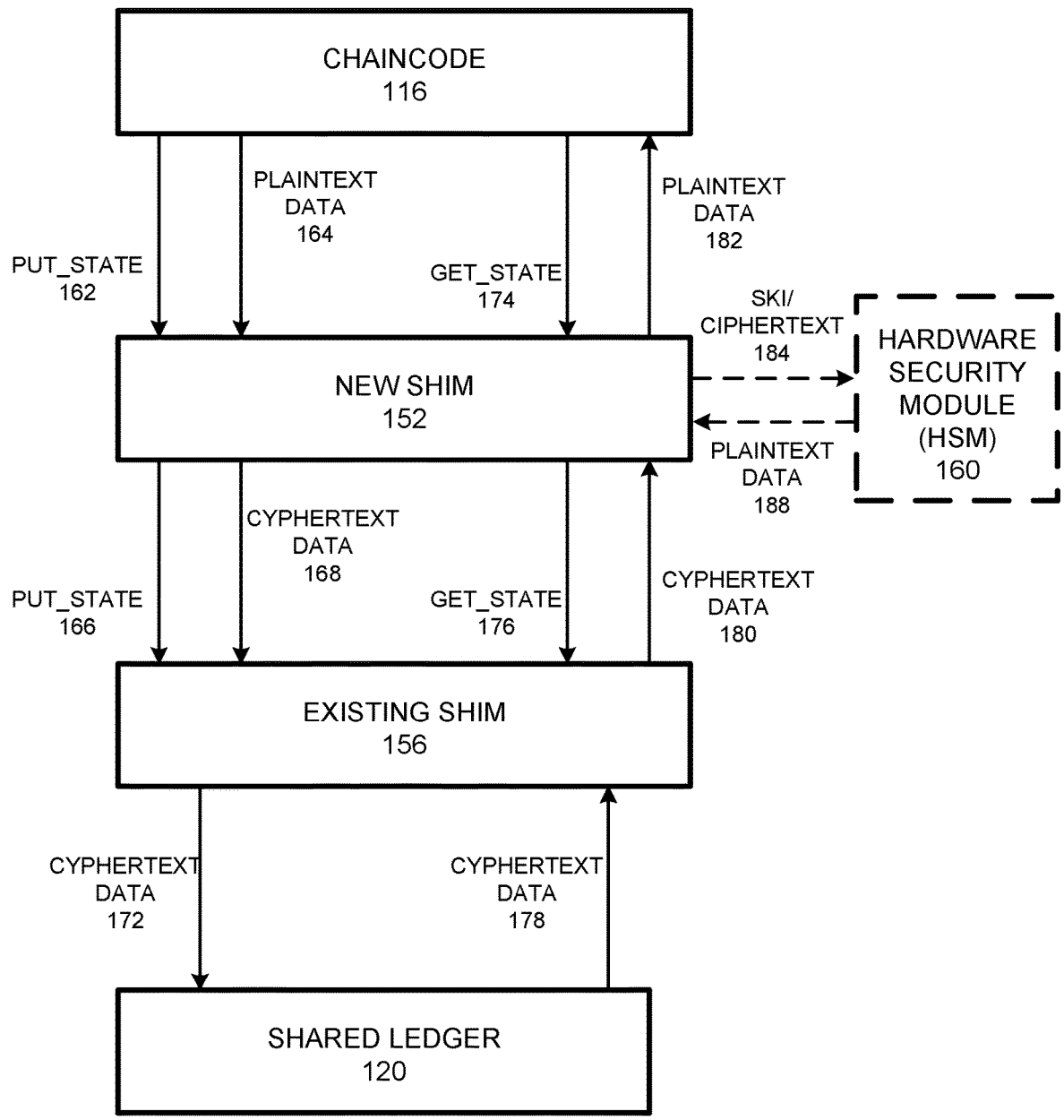
FIG. 1B illustrates a network diagram of an encryption/decryption component operating with a database, according to example embodiments.

FIG. 1B illustrates a network diagram of an encryption/decryption component operating with a database, according to example embodiments. Referring to FIG. 1B, the blockchain network 100 includes one or more endorser nodes or peers 112 that utilize the chaincode 116. All endorser nodes or peers 112 that execute the chaincode 116 include the chaincode 116, a shared ledger 120, and an existing shim layer 156 that provides an application programming interface between the chaincode 116 and the shared ledger 120. However, endorser nodes or peers 112 that process confidential chaincode 116 include an additional shim layer (new shim 152) between the chaincode 116 and the existing shim layer 156. By not modifying the existing shim layer 156, the fabric layer of the blockchain is preserved. The new shim layer 152 is used for both encryption and decryption of chaincode arguments and blockchain state. Shims represent the interface chaincode 116 will use to communicate with the external world. Shims expose functions to read state and to write state, to learn who created the transaction proposal and other functions. Every time a chaincode 116 invokes a shim function, that call is converted to a call to a function implemented on the peer side that derives an answer and sends it back to the chaincode 116.

The chaincode 116 stores plaintext data 164 by asserting a put_state command 162 to the new shim layer 152. The new shim 152 then encrypts the plaintext data 164 to create cyphertext or encrypted data 168, and asserts a put_state 166 command to the existing shim layer 156. When an endorser node/peer 112 receives a transaction proposal 108, it simulates the chaincode 116 execution and produces an output that will be eventually added to the shared ledger 120 at committing time (after ordering). The existing shim 156 then writes the cyphertext data 172 to the shared ledger 120. At this point, the shared ledger 120 contains encrypted cyphertext data 172.

The chaincode 116 retrieves plaintext data 182 from the shared ledger 120 by asserting a get_state command 174 to the new shim layer 152. The new shim 152 then asserts a get_state 176 command to the existing shim layer 156. The existing shim 156 then reads the cyphertext data 178 from the shared ledger 120. The existing shim layer 156 transfers the cyphertext data 180 to the new shim layer 152. The new shim layer 152 decrypts the cyphertext data 180 to create plaintext unencrypted data 182 and transfers the plaintext data 182 to the requesting chaincode 116.

In an alternative embodiment, an endorsing node or peer 112 may include a hardware security module (HSM) 160, which is a hardware device with limited storage capability, aiming to store sensitive encryption/decryption keys. The encryption/decryption keys are guaranteed to never leave the device 160 itself, and the device 160 allows limited set of operations to take place on it, (e.g., produce digital signatures using that secret, etc.). The HSM 160 may be used by endorsing nodes or peers 112 to store long-term secrets, and in the case of the present application also chaincode long-term secrets.

The HSM 160 provides additional security for decryption operations. Where received transaction proposals 108 include cyphertext and the chaincode 116 can access an HSM 160, the transient field of the transaction proposal 108 also includes a Subject Key Identifier (SKI). The SKI is passed to the HSM 160 every time a decryption operation is requested by the chaincode 116. In response to receiving an SKI/ciphertext 184, the HSM 160 produces plaintext data 188, which is then transferred to the chaincode 116 as plaintext data 182. For some embodiments, it is not necessary to utilize the HSM 160 for encryption since the encryption key is public.

Figure 2A:
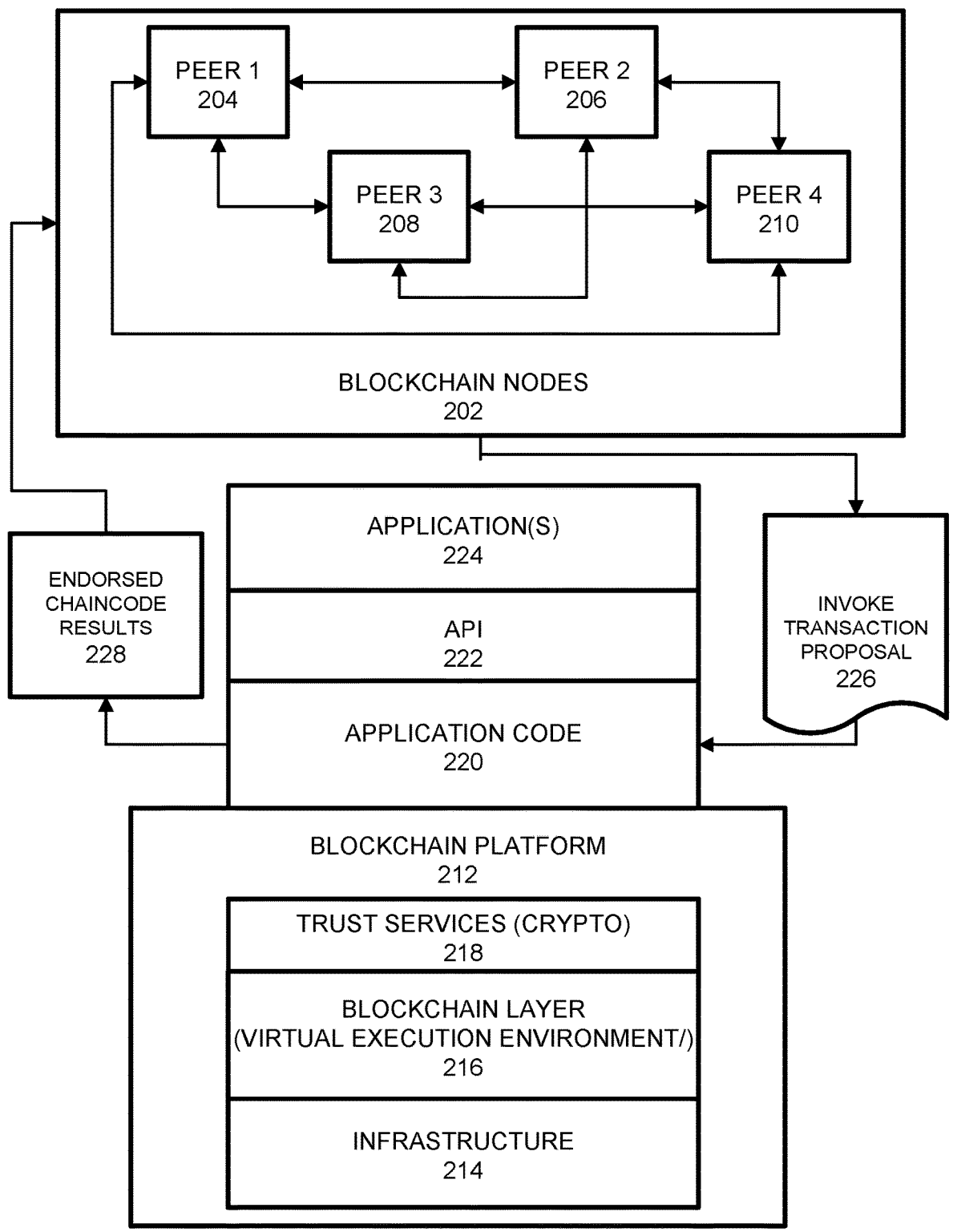
FIG. 2A illustrates an example peer node configuration, according to example embodiments.

FIG. 2A illustrates a blockchain architecture configuration 200, according to example embodiments. Referring to FIG. 2A, the blockchain architecture 200 may include certain blockchain elements, for example, a group of blockchain nodes 202. The blockchain nodes 202 may include one or more nodes 204-210 (these four nodes are depicted by example only). These nodes participate in a number of activities, such as blockchain transaction addition and validation process (consensus). One or more of the blockchain nodes 204-210 may endorse transactions based on endorsement policy and may provide an ordering service for all blockchain nodes in the architecture 200. A blockchain node may initiate a blockchain authentication and seek to write to a blockchain immutable ledger stored in blockchain layer 216, a copy of which may also be stored on the underpinning physical infrastructure 214. The blockchain configuration may include one or more applications 224 which are linked to application programming interfaces (APIs) 222 to access and execute stored program/application code 220 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2A may process and execute program/application code 220 via one or more interfaces exposed, and services provided, by blockchain platform 212. The code 220 may control blockchain assets. For example, the code 220 can store and transfer data, and may be executed by nodes 204-210 in the form of chaincode with conditions or other code elements subject to its execution. As a non-limiting example, smart contracts or chaincode may be created to execute reminders, updates, and/or other notifications subject to the changes, updates, etc. The smart contracts can themselves be used to identify rules associated with authorization and access requirements and usage of the ledger. For example, the invoke transaction proposals 226 related to a confidential chaincode may be processed by one or more processing entities (e.g., virtual machines) included in the blockchain layer 216. The result 228 may include endorsed chaincode results from executing the confidential chaincode by one or more selected endorsers. The physical infrastructure 214 may be utilized to retrieve any of the data or information described herein.

Chaincode may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details. In FIG. 2A, selected endorser nodes receive invoke transaction proposals related to a confidential chaincode. One function may be to provide endorsed chaincode results 228, which a blockchain client includes in a blockchain transaction, which may be provided to one or more of the nodes 204-210.

Figure 2B:
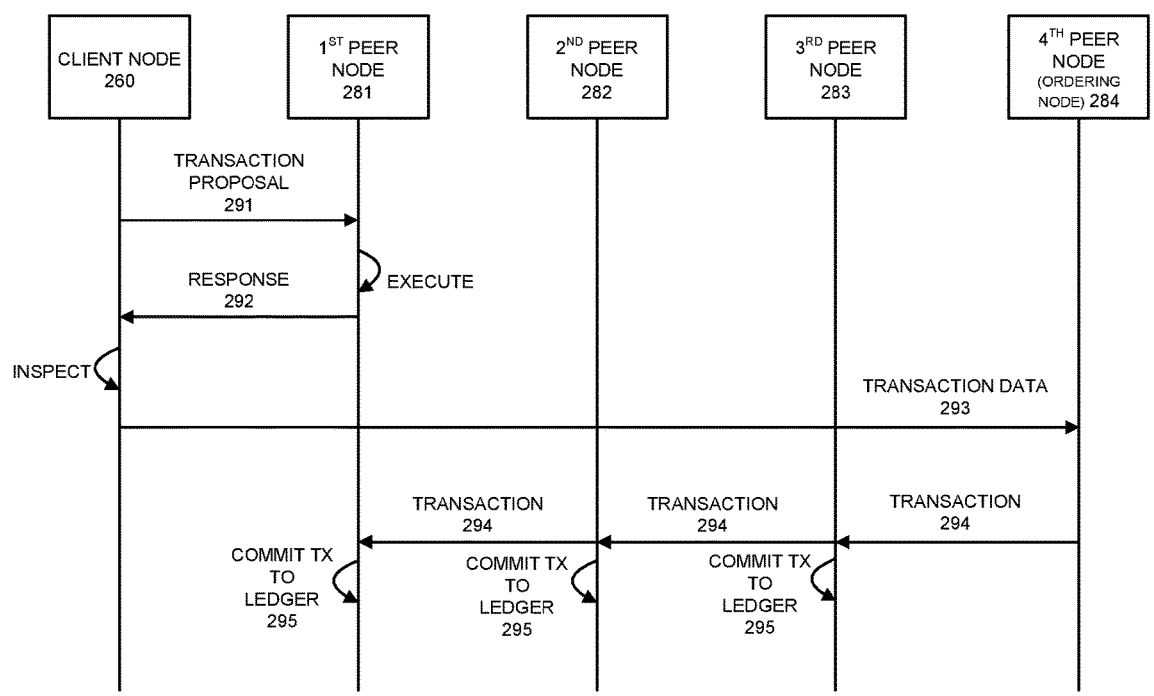
FIG. 2B illustrates a further peer node configuration, according to example embodiments.

FIG. 2B illustrates an example of a transactional flow 250 between nodes of the blockchain in accordance with an example embodiment. Referring to FIG. 2B, the transaction flow may include a transaction proposal 291 sent by an application client node 260 to an endorsing peer node 281. The endorsing peer 281 may verify the client signature and execute a chaincode function to initiate the transaction. The output may include the chaincode results, a set of key/value versions that were read in the chaincode (read set), and the set of keys/values that were written in chaincode (write set). The proposal response 292 is sent back to the client 260 along with an endorsement signature, if approved. The client 260 assembles the endorsements into a transaction message 293 and sends it to an ordering service node 284. The ordering service node 284 then delivers ordered transactions as blocks to all peers 281-283 on a channel. Before committal to the blockchain, each peer 281-283 may validate the transaction. For example, the peers may check the endorsement policy to ensure that the correct allotment of the specified peers have signed the results and authenticated the signatures against the transaction payload 293.

Referring again to FIG. 2B, the client node 260 initiates the transaction 291 by constructing and sending a request to the peer node 281, which is an endorser. The client 260 may include an application leveraging a supported software development kit (SDK), such as NODE, JAVA, PYTHON, and the like, which utilizes an available API to generate a transaction proposal. The proposal is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (client 260, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. However, no updates are made to the ledger at this point. In 292, the set of values, along with the endorsing peer node's 281 signature is passed back as a proposal response 292 to the SDK of the client 260 which parses the payload for the application to consume.

In response, the application of the client 260 inspects/verifies the endorsing peers signatures and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (i.e., did all peer nodes necessary for the transaction endorse the transaction). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 293 the client 260 assembles endorsements into a transaction and broadcasts the transaction proposal and response within a transaction message to the ordering node 284. The transaction may contain the read/write sets, the endorsing peers signatures and a channel ID. The ordering node 284 does not need to inspect the entire content of a transaction in order to perform its operation, instead the ordering node 284 may simply receive transactions from all channels in the network, order them chronologically by channel, and create blocks of transactions per channel.

The blocks of the transaction are delivered from the ordering node 284 to all peer nodes 281-283 on the channel. The transactions 294 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain, and for each valid transaction the write sets are committed to current state database. An event is emitted, to notify the client application that the transaction (invocation) has been immutably appended to the chain, as well as to notify whether the transaction was validated or invalidated.

Figure 3:
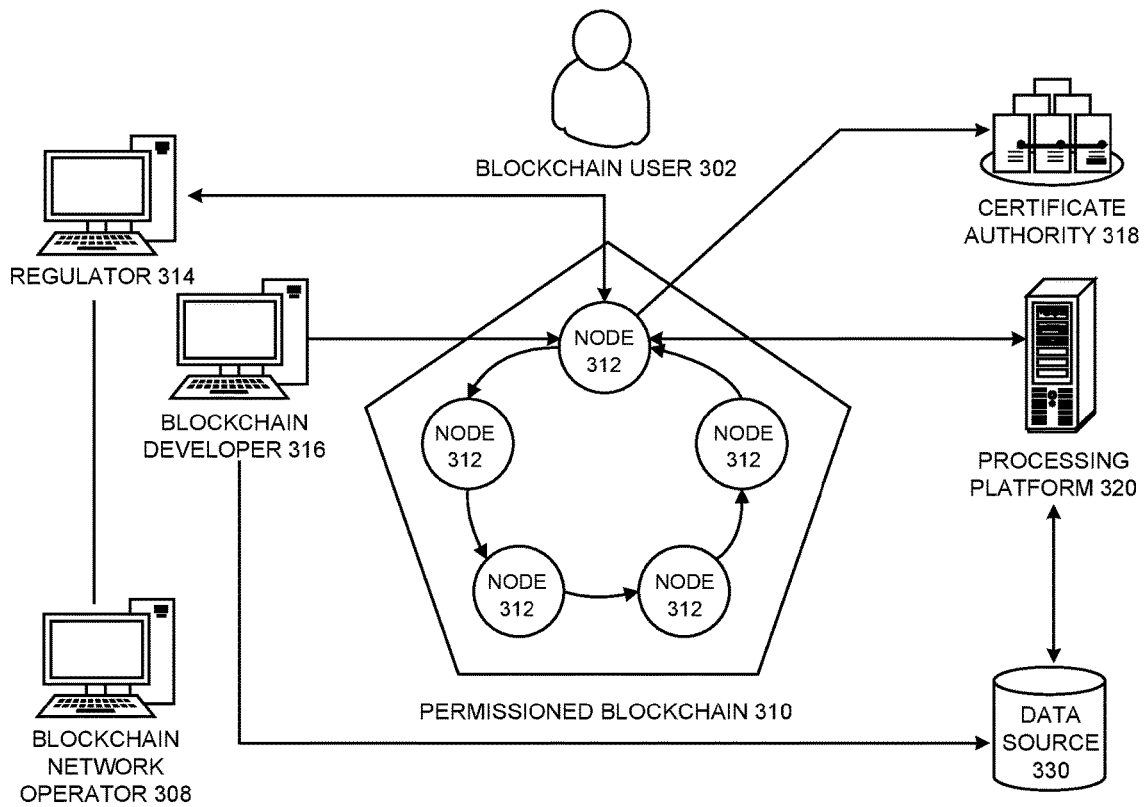
FIG. 3 illustrates a permissioned network, according to example embodiments.

FIG. 3 illustrates an example of a permissioned blockchain network 300, which features a distributed, decentralized peer-to-peer architecture, and a certificate authority 318 managing user roles and permissions. In this example, the blockchain user 302 may submit a transaction to the permissioned blockchain network 310. In this example, the transaction can be a deploy, invoke, or query, and may be issued through a client-side application leveraging an SDK, directly through a REST API, or the like. Trusted business networks may provide access to regulator systems 314, such as auditors (the Securities and Exchange Commission in a U.S. equities market, for example). Meanwhile, a blockchain network operator system of nodes 308 manage member permissions, such as enrolling the regulator system 310 as an "auditor" and the blockchain user 302 as a "client". An auditor could be restricted only to querying the ledger whereas a client could be authorized to deploy, invoke, and query certain types of chaincode.

A blockchain developer system 316 writes chaincode and client-side applications. The blockchain developer system 316 can deploy chaincode directly to the network through a REST interface. To include credentials from a traditional data source 330 in chaincode, the developer system 316 could use an out-of-band connection to access the data. In this example, the blockchain user 302 connects to the network through a peer node 312. Before proceeding with any transactions, the peer node 312 retrieves the user's enrollment and transaction certificates from the certificate authority 318. In some cases, blockchain users must possess these digital certificates in order to transact on the permissioned blockchain network 310. Meanwhile, a user attempting to drive chaincode may be required to verify their credentials on the traditional data source 330. To confirm the user's authorization, chaincode can use an out-of-band connection to this data through a traditional processing platform 320.

Figure 4:
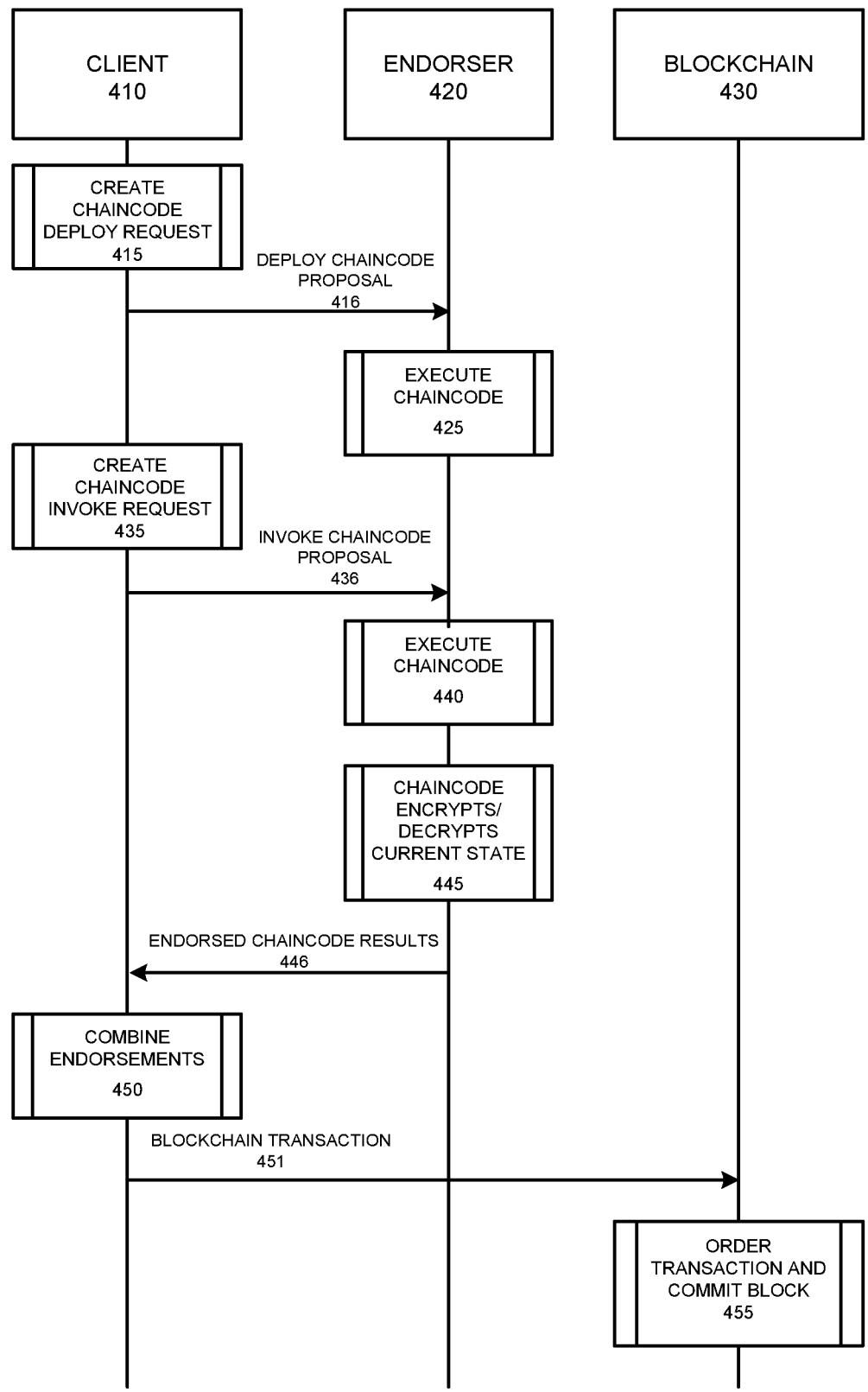
FIG. 4 illustrates a system messaging diagram for performing chaincode encryption and decryption, according to example embodiments.

FIG. 4 illustrates a system messaging diagram 400 for performing chaincode encryption and decryption, according to example embodiments. Referring to FIG. 4, the system messaging diagram 400 includes a blockchain client 410, one or more endorser nodes or peers 420, and a blockchain 430. The blockchain 430 includes blockchain network 100 resources dedicated to creating and committing blocks to a blockchain, including orderer nodes or peers 132 and committer nodes or peers 140.

The blockchain client 410 receives a new confidential chaincode 116 that needs to be deployed to the blockchain network 100. The blockchain client 410 creates a chaincode deploy request 415, and transfers a deploy chaincode transaction proposal 416 to the endorser nodes or peers 420 in the blockchain network 100 that would be aware of the existence of the new chaincode 116. However, these endorser nodes or peers 420 would not be aware of secret keys the chaincode 116 is in possession of. In response, the endorser nodes or peers 420 execute the chaincode 425.

The blockchain client 410 next creates a chaincode invoke request 435, and transfers an invoke chaincode transaction proposal 436 to the endorser nodes or peers 420. The endorser nodes or peers 420 execute the chaincode 440 and encrypt/decrypt the current state of the blockchain 445. The endorser nodes or peers 420 next sign and endorse the transaction proposal 108, and return endorsed chaincode results 446 to the blockchain client 410.

After the blockchain client 410 receives endorsed chaincode results 446 from all endorsing endorser nodes or peers 420, the blockchain client 410 combines the endorsements 450 and generates a corresponding blockchain transaction 451 to the blockchain 430. Finally, the blockchain 430 orders the blockchain transaction into a new block and commits the block to the blockchain 455.

Figure 5A:
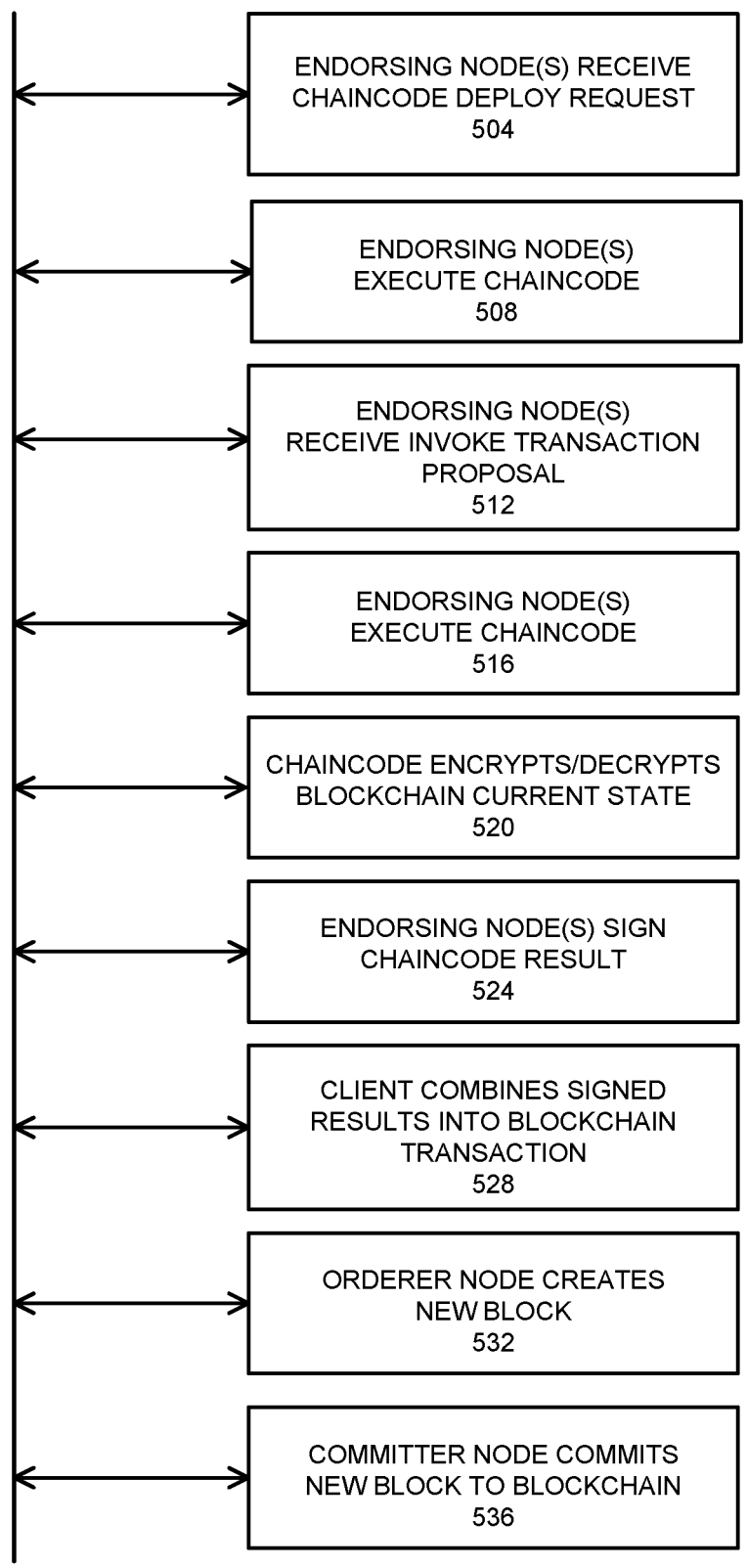
FIG. 5A illustrates a flow diagram of a method for performing chaincode encryption and decryption, according to example embodiments.

FIG. 5A illustrates a flow diagram 500 of a method for performing chaincode encryption and decryption, according to example embodiments. Referring to FIG. 5A, the method 500 may include one or more of the following steps.

At block 504, the endorsing nodes or peers 112 receive a chaincode deploy request as a transaction proposal. The chaincode 116 is a confidential chaincode that encrypts and decrypts chaincode arguments and blockchain state. The chaincode deploy transaction proposal is required in order to introduce a new chaincode 116 into the blockchain network 100.

At block 508, the endorsing nodes or peers 112 execute the chaincode 116. The endorsing nodes or peers 112 create new Docker containers with this chaincode embedded. The container will be started, and an Init method will be executed. For both deploy and invocation blockchain transactions, encryption is involved.

At block 512, endorsing nodes or peers 112 next receive an invoke transaction proposal. The invoke transaction proposal directs the chaincode to execute the chaincode and modify the state of the variables and arguments in the shared ledger 120. Each Invoke transaction will be added to a new block in the shared ledger 120.

At block 516, the endorsing nodes or peers 112 execute the chaincode 116. For both deploy and invocation blockchain transactions, encryption is involved.

At block 520, the chaincode encrypts and/or decrypts the blockchain current state. The encryption of arguments and current blockchain state is performed using a put_state command as described with reference to FIG. 4. The decryption of arguments and current blockchain state is performed using a get_state command, also as described with reference to FIG. 4.

At block 524, the endorsing nodes or peers 112 sign/endorse the executed chaincode result, and transfer the endorsed results to the blockchain client 104.

At block 528, after all of the endorsed chaincode results have been received from the participating endorser nodes or peers 112, the blockchain client 104 combines the endorsements into a new blockchain transaction. The blockchain client 104 transfers the new blockchain transaction to an orderer node or peer 132.

At block 532, the orderer node or peer 132 receives blockchain transactions, and combines blockchain transactions into a new block, based on established and known criteria. After creating the new block, the orderer node or peer 132 transfers the new block to one or more committer nodes or peers 140.

At block 536, the committer nodes or peers 140 commit the new block to shared ledgers 120 of the blockchain.

Figure 5B:
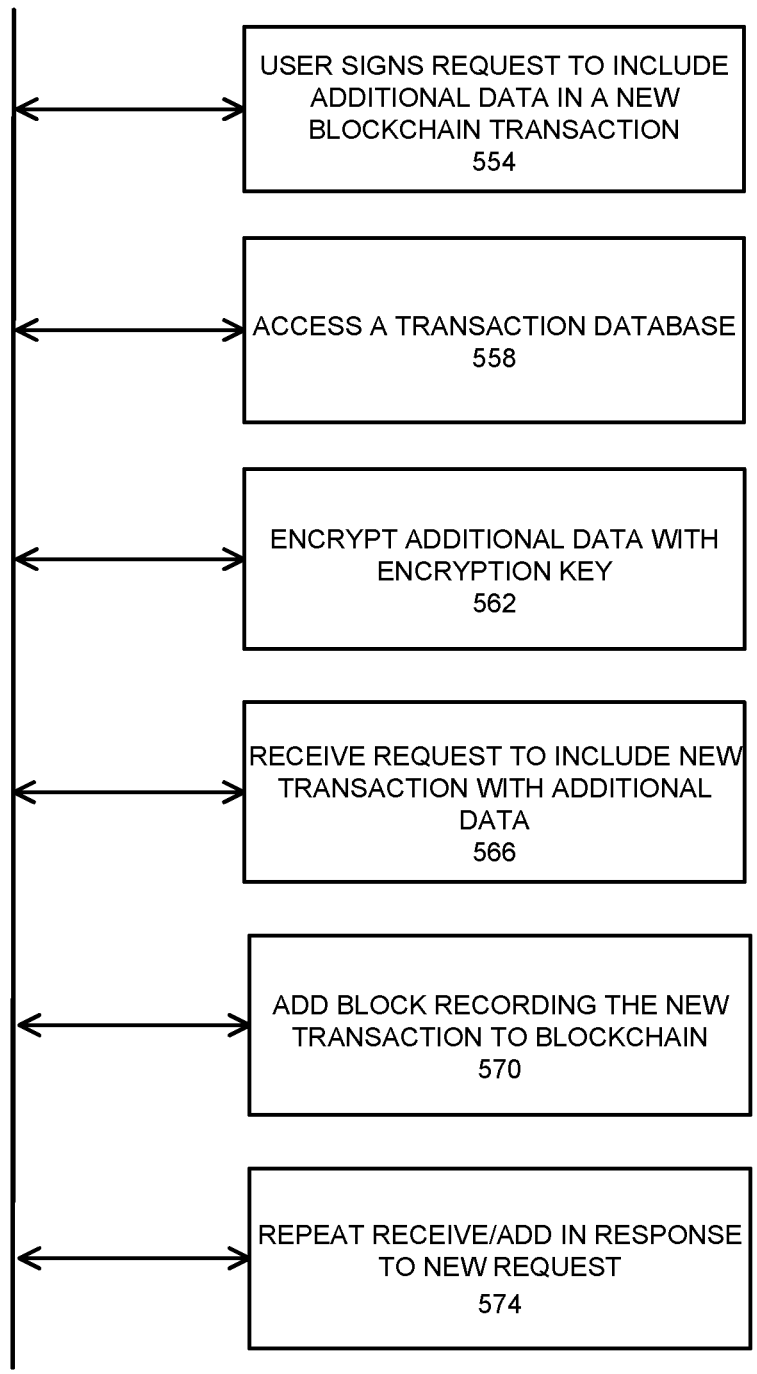
FIG. 5B illustrates a flow diagram of an example method of storing encrypted data in a blockchain, according to example embodiments.

FIG. 5B illustrates a flow diagram 550 of an example method of storing encrypted data in a blockchain, according to example embodiments. Referring to FIG. 5B, the method 550 may also include one or more of the following steps.

At block 554, a user signs a request to include additional data in a new blockchain transaction. The transactions include data to be stored in the blockchain and the record blocks are records that confirm when and in what sequence certain transaction became journaled as part of the blockchain.

At block 558, a computing node accesses a transaction database. The computing node is one of multiple computing nodes in a system using a blockchain protocol to share a transaction database.

At block 562, additional data is encrypted using an encryption key. The encryption key may be a symmetrical key, public-private key, other cryptographic key, or a combination thereof. In another example, the additional data may be divided into a plurality of sections and each of the sections is encrypted with its own unique encryption key. A category may be assigned to the additional data and the encryption key is associated with the category.

At block 566, the computing node receives the request from the user or entity. Typically, the request is signed by the user system to include the new transaction with additional data in the blockchain, where the additional data has been encrypted with an encryption key in block 562.

At block 570, a block or record block is added that records the new transaction with additional data in the blockchain. A transaction ID, which is unique to each transaction in the blockchain, may be included. Optionally, a timestamp and/or category of the additional data is included. Additionally, a hash of a previous block combined with the current block may be included as well to make tampering or changes to the blockchain difficult.

At block 574, a test is made to see if there is another request from the user system to include more data. If there is subsequent request, the process repeats 566 and 570 for each request. Otherwise the process flow ends at block 574.

Figure 6A:
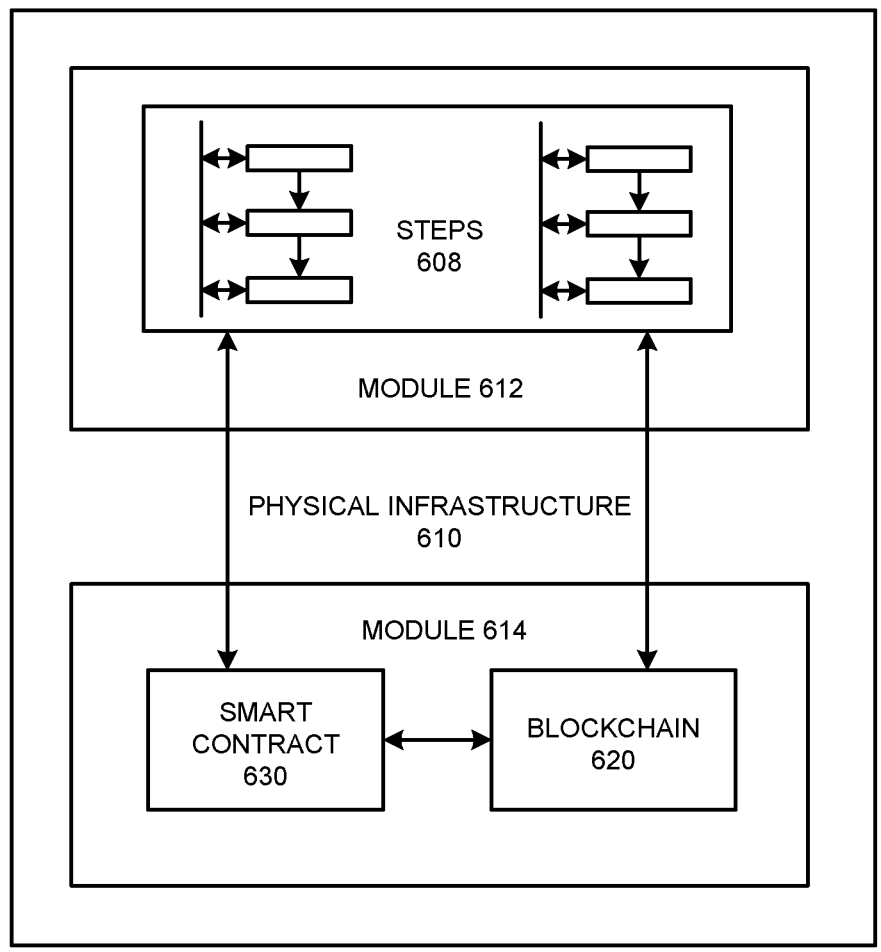
FIG. 6A illustrates an example system configured to perform one or more operations described herein, according to example embodiments.

FIG. 6A illustrates an example system 600 that includes a physical infrastructure 610 configured to perform various operations according to example embodiments. Referring to FIG. 6A, the physical infrastructure 610 includes a module 612 and a module 614. The module 614 includes a blockchain 620 and a smart contract 630 (which may reside on the blockchain 620), that may execute any of the operational steps 608 (in module 612) included in any of the example embodiments. The steps/operations 608 may include one or more of the embodiments described or depicted and may represent output or written information that is written or read from one or more smart contracts 630 and/or blockchains 620. The physical infrastructure 610, the module 612, and the module 614 may include one or more computers, servers, processors, memories, and/or wireless communication devices. Further, the module 612 and the module 614 may be a same module.

Figure 6B:
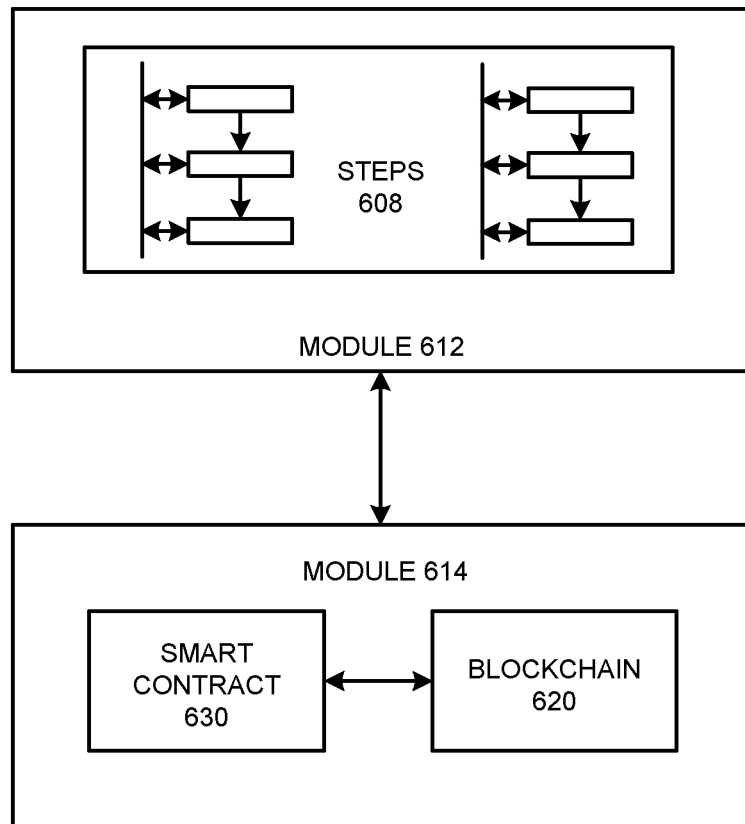
FIG. 6B illustrates a further example system configured to perform one or more operations described herein, according to example embodiments.

FIG. 6B illustrates an example system 640 configured to perform various operations according to example embodiments. Referring to FIG. 6B, the system 640 includes a module 612 and a module 614. The module 614 includes a blockchain 620 and a smart contract 630 (which may reside on the blockchain 620), that may execute any of the operational steps 608 (in module 612) included in any of the example embodiments. The steps/operations 608 may include one or more of the embodiments described or depicted and may represent output or written information that is written or read from one or more smart contracts 630 and/or blockchains 620. The physical infrastructure 610, the module 612, and the module 614 may include one or more computers, servers, processors, memories, and/or wireless communication devices. Further, the module 612 and the module 614 may be a same module.

Figure 6C:
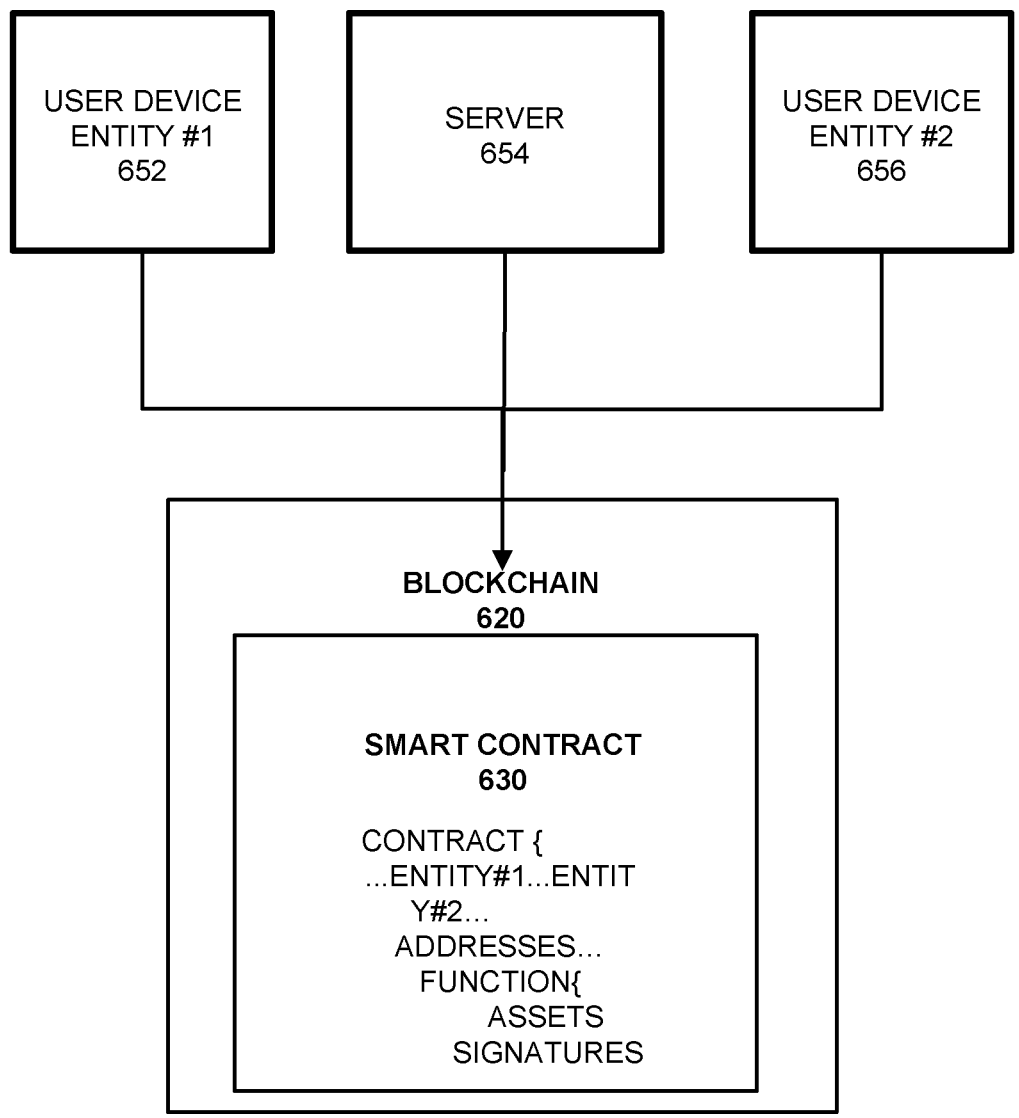
FIG. 6C illustrates a smart contract configuration among contracting parties and a mediating server configured to enforce the smart contract terms on the blockchain according to example embodiments.

FIG. 6C illustrates an example smart contract configuration among contracting parties and a mediating server configured to enforce the smart contract terms on the blockchain according to example embodiments. Referring to FIG. 6C, the configuration 650 may represent a communication session, an asset transfer session or a process or procedure that is driven by a smart contract 630 which explicitly identifies one or more user devices 652 and/or 656. The execution, operations and results of the smart contract execution may be managed by a server 654. Content of the smart contract 630 may require digital signatures by one or more of the entities 652 and 656 which are parties to the smart contract transaction. The results of the smart contract execution may be written to a blockchain 620 as a blockchain transaction. The smart contract 630 resides on the blockchain 620 which may reside on one or more computers, servers, processors, memories, and/or wireless communication devices.

Figure 6D:
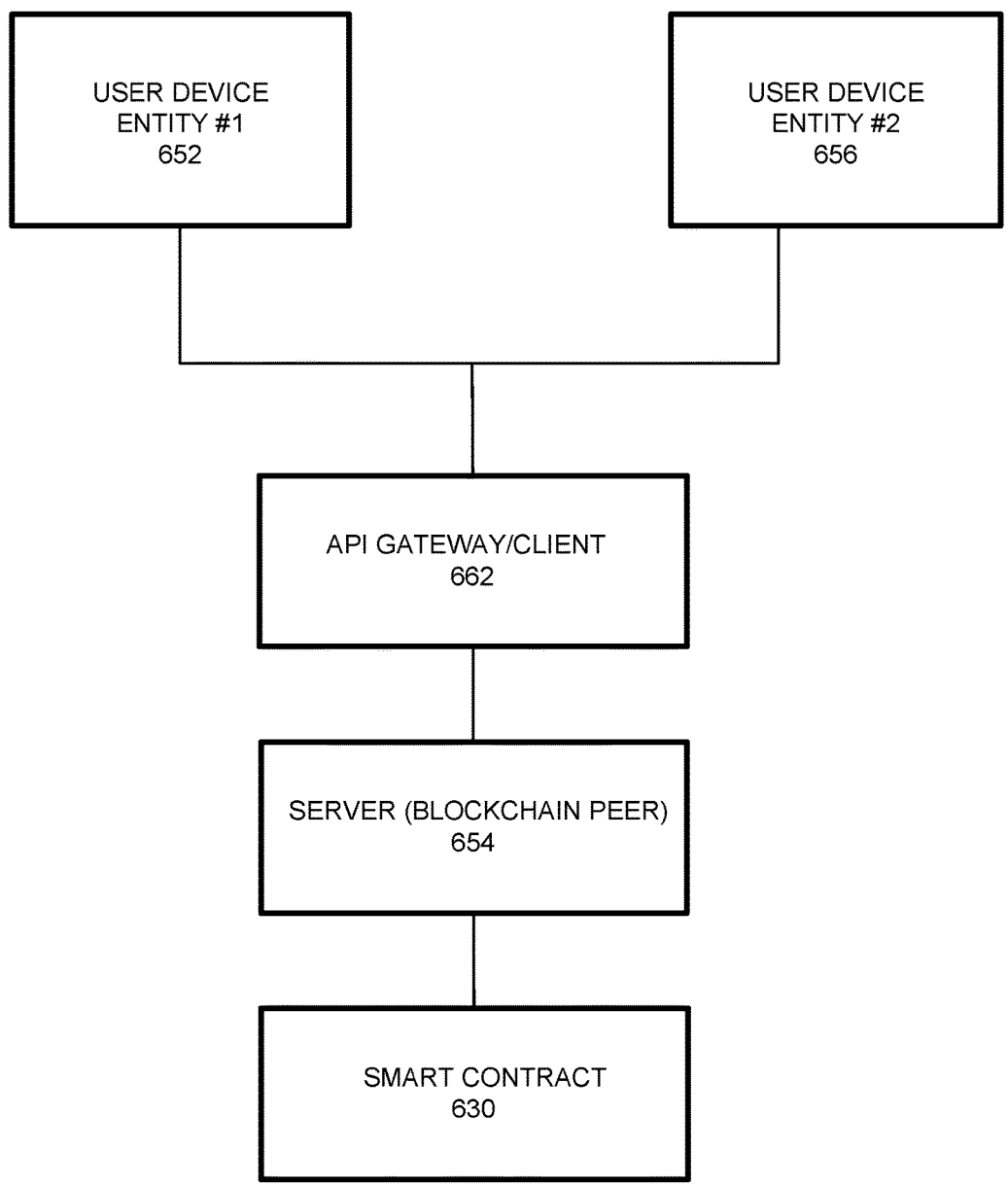
FIG. 6D illustrates another an additional example system, according to example embodiments.

FIG. 6D illustrates a system 660 including a blockchain, according to example embodiments. Referring to the example of FIG. 6D, an application programming interface (API) gateway 662 provides a common interface for accessing blockchain logic (e.g., smart contract 630 or other chaincode) and data (e.g., distributed ledger, etc.). In this example, the API gateway 662 is a common interface for performing transactions (invoke, queries, etc.) on the blockchain by connecting one or more entities 652 and 656 to a blockchain peer (i.e., server 654). Here, the server 654 is a blockchain network peer component that holds a copy of the world state and a distributed ledger allowing clients 652 and 656 to query data on the world state as well as submit transactions into the blockchain network where, depending on the smart contract 630 and endorsement policy, endorsing peers will run the smart contracts 630.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components.

Figure 7A:
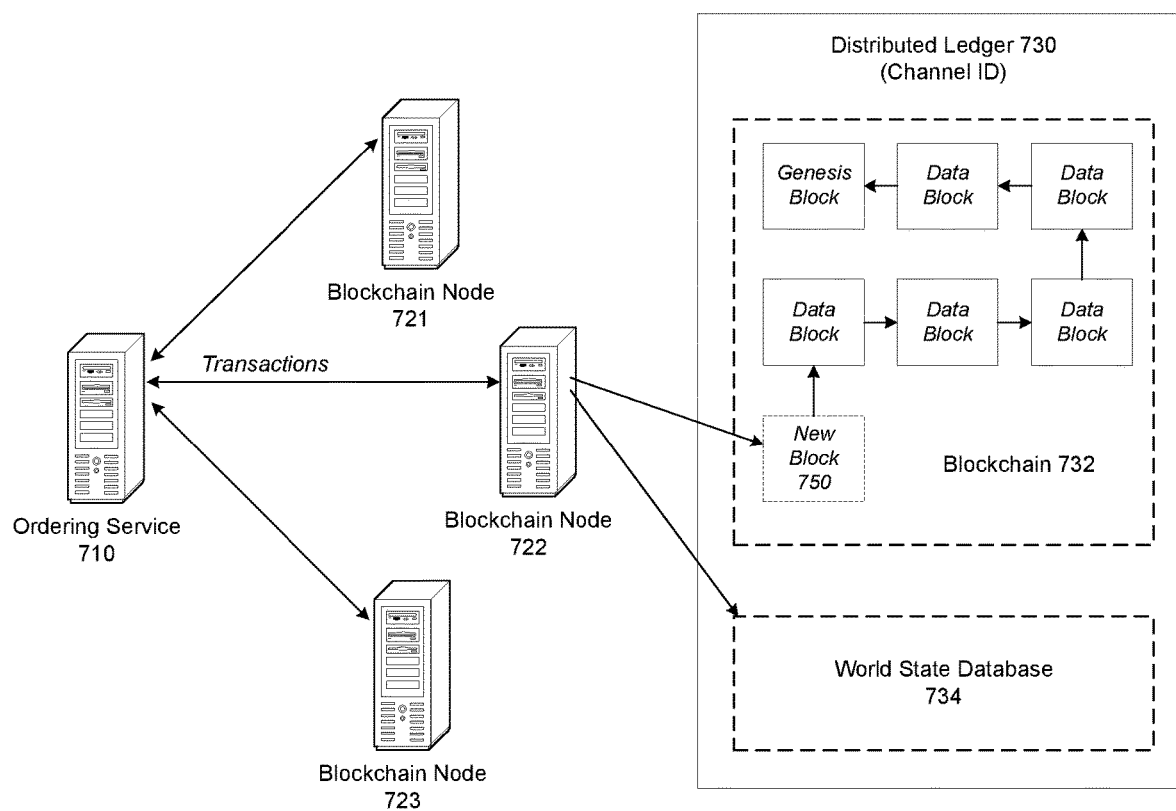
FIG. 7A illustrates a process of new data being added to a database, according to example embodiments.
Figure 7B:
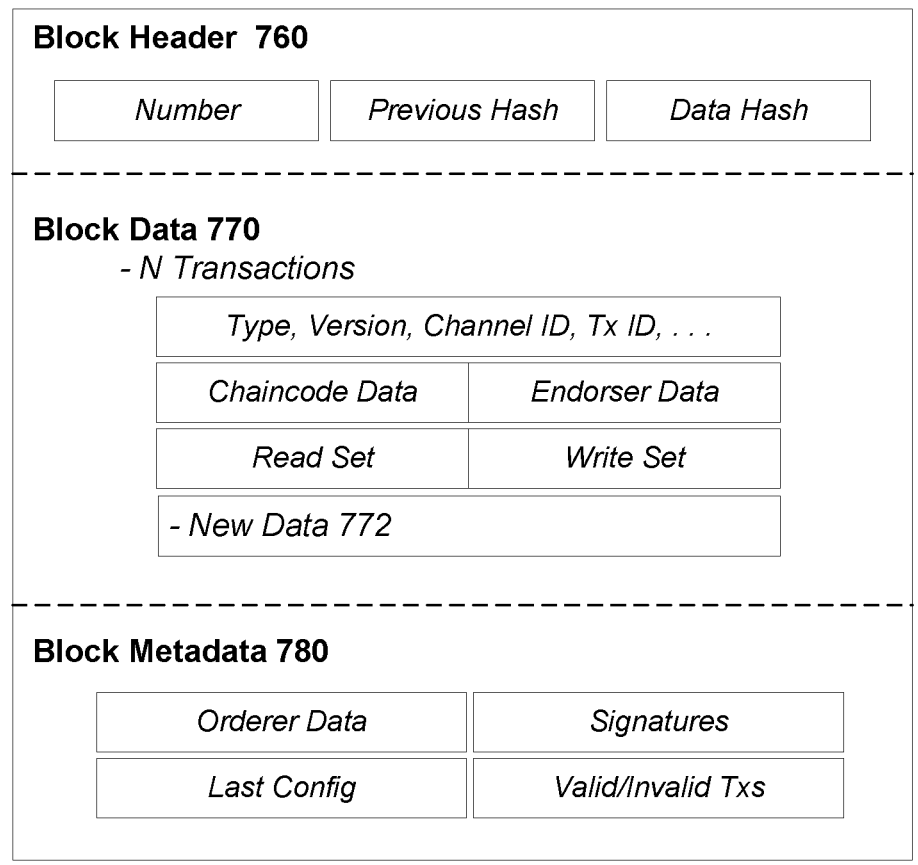
FIG. 7B illustrates contents a data block including the new data, according to example embodiments.

FIG. 7A illustrates a process 700 of a new block being added to a distributed ledger 730, according to example embodiments, and FIG. 7B illustrates contents of a block structure 750 for blockchain, according to example embodiments. Referring to FIG. 7A, clients (not shown) may submit transactions to blockchain nodes 721, 722, and/or 723. Clients may be instructions received from any source to enact activity on the blockchain 730. As an example, clients may be applications that act on behalf of a requester, such as a device, person or entity to propose transactions to deploy confidential chaincodes for the blockchain. The plurality of blockchain peers (e.g., blockchain nodes 721, 722, and 723) may maintain a state of the blockchain network and a copy of the distributed ledger 730. Different types of blockchain nodes/peers may be present in the blockchain network including endorsing peers which simulate and endorse transactions proposed by clients and encrypt/decrypt chaincode arguments and blockchain state, and committing peers which verify endorsements, validate transactions, and commit transactions to the distributed ledger 730. In this example, the blockchain nodes 721, 722, and 723 may perform the role of endorser node, committer node, or both.

The distributed ledger 730 includes a blockchain 732 which stores immutable, sequenced records in blocks, and a state database 734 (current world state) maintaining a current state of the blockchain 732. One distributed ledger 730 may exist per channel and each peer maintains its own copy of the distributed ledger 730 for each channel of which they are a member. The blockchain 732 is a transaction log, structured as hash-linked blocks where each block contains a sequence of N transactions. Blocks may include various components such as shown in FIG. 7B. The linking of the blocks (shown by arrows in FIG. 7A) may be generated by adding a hash of a prior block's header within a block header of a current block. In this way, all transactions on the blockchain 732 are sequenced and cryptographically linked together preventing tampering with blockchain data without breaking the hash links. Furthermore, because of the links, the latest block in the blockchain 732 represents every transaction that has come before it. The blockchain 732 may be stored on a peer file system (local or attached storage), which supports an append-only blockchain workload.

The current state of the blockchain 732 and the distributed ledger 732 may be stored in the state database 734. Here, the current state data represents the latest values for all keys ever included in the chain transaction log of the blockchain 732. Chaincode invocations execute transactions against the current state in the state database 734. To make these chaincode interactions extremely efficient, the latest values of all keys are stored in the state database 734. The state database 734 may include an indexed view into the transaction log of the blockchain 732, it can therefore be regenerated from the chain at any time. The state database 734 may automatically get recovered (or generated if needed) upon peer startup, before transactions are accepted.

Endorsing nodes receive transaction proposals from clients and endorse the transaction based on simulated results. Endorsing nodes hold smart contracts which simulate the transaction proposals. When an endorsing node endorses a transaction, the endorsing nodes creates a transaction endorsement which is a signed response from the endorsing node to the client application indicating the endorsement of the simulated transaction. The method of endorsing a transaction depends on an endorsement policy which may be specified within chaincode. An example of an endorsement policy is "the majority of endorsing peers must endorse the transaction". Different channels may have different endorsement policies. Endorsed transactions are forward by the client application to ordering service 710.

The ordering service 710 accepts endorsed transactions, orders them into a block, and delivers the blocks to the committing peers. For example, the ordering service 710 may initiate a new block when a threshold of transactions has been reached, a timer times out, or another condition. In the example of FIG. 7A, blockchain node 722 is a committing peer that has received a new data block 750, including encrypted data, for storage on blockchain 730.

The ordering service 710 may be made up of a cluster of orderers. The ordering service 710 does not process transactions, smart contracts, or maintain the shared ledger. Rather, the ordering service 710 may accept the endorsed transactions and specifies the order in which those transactions are committed to the distributed ledger 730. The architecture of the blockchain network may be designed such that the specific implementation of 'ordering' (e.g., Solo, Kafka, BFT, etc.) becomes a pluggable component.

Transactions are written to the distributed ledger 730 in a consistent order. The order of transactions is established to ensure that the updates to the state database 734 are valid when they are committed to the network. Unlike a crypto-currency blockchain system (e.g., Bitcoin, etc.) where ordering occurs through the solving of a cryptographic puzzle, or mining, in this example the parties of the distributed ledger 730 may choose the ordering mechanism that best suits that network.

When the ordering service 710 initializes a new block 750, the new block 750 may be broadcast to committing peers (e.g., blockchain nodes 721, 722, and 723). In response, each committing peer validates the transaction within the new block 750 by checking to make sure that the read set and the write set still match the current world state in the state database 734. Specifically, the committing peer can determine whether the read data that existed when the endorsers simulated the transaction is identical to the current world state in the state database 734. When the committing peer validates the transaction, the transaction is written to the blockchain 732 on the distributed ledger 730, and the state database 734 is updated with the write data from the read-write set. If a transaction fails, that is, if the committing peer finds that the read-write set does not match the current world state in the state database 734, the transaction ordered into a block will still be included in that block, but it will be marked as invalid, and the state database 734 will not be updated.

Referring to FIG. 7B, a block 750 (also referred to as a data block) that is stored on the blockchain 732 of the distributed ledger 730 may include multiple data segments such as a block header 760, block data 770, and block metadata 780. It should be appreciated that the various depicted blocks and their contents, such as block 750 and its contents. shown in FIG. 7B are merely for purposes of example and are not meant to limit the scope of the example embodiments. In some cases, both the block header 760 and the block metadata 780 may be smaller than the block data 770 which stores transaction data, however this is not a requirement. The block 750 may store transactional information of N transactions (e.g., 100, 500, 1000, 2000, 3000, etc.) within the block data 770. The block 750 may also include a link to a previous block (e.g., on the blockchain 732 in FIG. 7A) within the block header 760. In particular, the block header 760 may include a hash of a previous block's header. The block header 760 may also include a unique block number, a hash of the block data 770 of the current block 750, and the like. The block number of the block 750 may be unique and assigned in an incremental/sequential order starting from zero. The first block in the blockchain may be referred to as a genesis block which includes information about the blockchain, its members, the data stored therein, etc.

The block data 770 may store transactional information of each transaction that is recorded within the block 750. For example, the transaction data may include one or more of a type of the transaction, a version, a timestamp, a channel ID of the distributed ledger 730, a transaction ID, an epoch, a payload visibility, a chaincode path (deploy tx), a chaincode name, a chaincode version, input (chaincode and functions), a client (creator) identify such as a public key and certificate, a signature of the client, identities of endorsers, endorser signatures, a proposal hash, chaincode events, response status, namespace, a read set (list of key and version read by the transaction, etc.), a write set (list of key and value, etc.), a start key, an end key, a list of keys, a Merkel tree query summary, and the like. The transaction data may be stored for each of the N transactions.

In some embodiments, the block data 770 may also store data 772 which adds additional information to the hash-linked chain of blocks in the blockchain 732. Accordingly, the data 772 can be stored in an immutable log of blocks on the distributed ledger 730. Some of the benefits of storing such data 772 are reflected in the various embodiments disclosed and depicted herein.

The block metadata 780 may store multiple fields of metadata (e.g., as a byte array, etc.). Metadata fields may include signature on block creation, a reference to a last configuration block, a transaction filter identifying valid and invalid transactions within the block, last offset persisted of an ordering service that ordered the block, and the like. The signature, the last configuration block, and the orderer metadata may be added by the ordering service 710. Meanwhile, a committer of the block (such as blockchain node 722) may add validity/invalidity information based on an endorsement policy, verification of read/write sets, and the like. The transaction filter may include a byte array of a size equal to the number of transactions in the block data 770 and a validation code identifying whether a transaction was valid/invalid.

Figure 8:
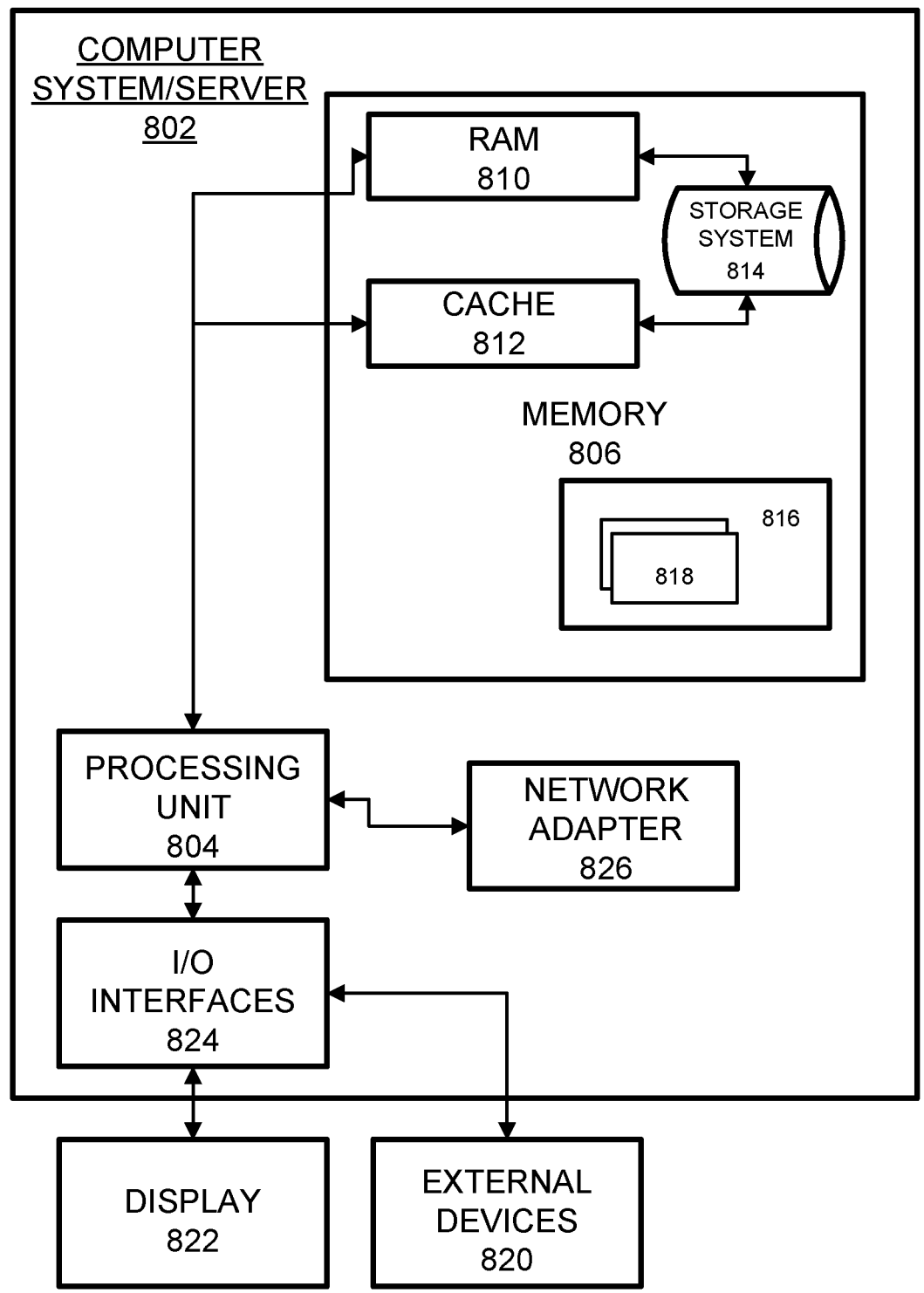
FIG. 8 illustrates an example system that supports one or more of the example embodiments.

FIG. 8 is not intended to suggest any limitation as to the scope of use or functionality of embodiments of the application described herein. Regardless, the computing node 800 is capable of being implemented and/or performing any of the functionality set forth hereinabove.

In computing node 800 there is a computer system/server 802, which is operational with numerous other general purpose or special purpose computing system environments or configurations. Examples of well-known computing systems, environments, and/or configurations that may be suitable for use with computer system/server 802 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 802 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 802 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 802 in cloud computing node 800 is shown in the form of a general-purpose computing device. The components of computer system/server 802 may include, but are not limited to, one or more processors or processing units 804, a system memory 806, and a bus that couples various system components including system memory 806 to processor 804.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 802 typically includes a variety of computer system readable media. Such media may be any available media that is accessible by computer system/server 802, and it includes both volatile and non-volatile media, removable and non-removable media. System memory 806, in one embodiment, implements the flow diagrams of the other figures. The system memory 806 can include computer system readable media in the form of volatile memory, such as random-access memory (RAM) 810 and/or cache memory 812. Computer system/server 802 may further include other removable/non-removable, volatile/non-volatile computer system storage media. By way of example only, storage system 814 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 806 may include at least one program product having a set (e.g., at least one) of program modules that are configured to carry out the functions of various embodiments of the application.

Program/utility 816, having a set (at least one) of program modules 818, may be stored in memory 806 by way of example, and not limitation, as well as an operating system, one or more application programs, other program modules, and program data. Each of the operating system, one or more application programs, other program modules, and program data or some combination thereof, may include an implementation of a networking environment. Program modules 818 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 802 may also communicate with one or more external devices 820 such as a keyboard, a pointing device, a display 822, etc.; one or more devices that enable a user to interact with computer system/server 802; and/or any devices (e.g., network card, modem, etc.) that enable computer system/server 802 to communicate with one or more other computing devices. Such communication can occur via I/O interfaces 824. Still yet, computer system/server 802 can communicate with one or more networks such as a local area network (LAN), a general wide area network (WAN), and/or a public network (e.g., the Internet) via network adapter 826. As depicted, network adapter 826 communicates with the other components of computer system/server 802 via a bus. It should be understood that although not shown, other hardware and/or software components could be used in conjunction with computer system/server 802. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A hardware-implemented endorser node in a blockchain network, the hardware-implemented endorser node comprising:
  a hardware-implemented processor configured to execute one or more instruction stored in a memory to configure the hardware-implemented processor to:

receive a chaincode invoke transaction proposal from a blockchain client in the blockchain network;

execute chaincode that corresponds to the chaincode invoke transaction proposal using a first shim layer between the chaincode and a shared ledger of a blockchain in the blockchain network to process data related to non-encrypted chaincode and a second shim layer to process data related to encrypted chaincode to encrypt a state of the blockchain, wherein the first shim layer is not modified to support encryption or decryption of chaincode arguments or to support encryption or decryption of the state of the blockchain;

write the encrypted state of the blockchain to the shared ledger;

read the encrypted state of the blockchain from the shared ledger using the second shim layer;

decrypt the encrypted state of the blockchain using the second shim layer;

endorse a result of the executed chaincode; and send the endorsed result to the blockchain client to create a blockchain transaction.

2. The hardware-implemented endorser node of claim 1, wherein the first shim layer provides an application programming interface between the chaincode and the shared ledger.

3. The hardware-implemented endorser node of claim 1, wherein the second shim layer is between the chaincode and the first shim layer.

4. The hardware-implemented endorser node of claim 3, wherein, when the hardware-implemented processor is configured to write the encrypted state of the blockchain to the shared ledger, the hardware-implemented processor is further configured to:

send the encrypted state of the blockchain from the second shim layer to the first shim layer and from the first shim layer to the shared ledger.

5. The hardware-implemented endorser node of claim 3, wherein, when the hardware-implemented processor is configured to read the encrypted state of the blockchain from the shared ledger, the hardware-implemented processor is further configured to:

receive, by the first shim layer, the encrypted state of the blockchain from the shared ledger and send the encrypted state of the blockchain to the second shim layer from the first shim layer.

6. The hardware-implemented endorser node of claim 1, wherein the hardware-implemented processor is configured to:

receive a chaincode deploy transaction proposal from the blockchain client, wherein the chain code deploy transaction proposal comprises a transient field comprising a master key and encrypted deploy arguments.

7. The hardware-implemented endorser node of claim 6, wherein the chaincode invoke transaction proposal comprises:

an encryption key derived from the master key, wherein the encryption key is used to encrypt a chaincode argument.

8. A method, comprising:

receiving, by an endorser node in a blockchain network, a chaincode invoke transaction proposal from a blockchain client in the blockchain network;

executing, by the endorser node, chaincode corresponding to the chaincode invoke transaction proposal using a first shim layer between the chaincode and a shared ledger of a blockchain in the blockchain network to process data related to non-encrypted chaincode and a second shim layer to process data related to encrypted chaincode to encrypt a state of the blockchain, wherein the first shim layer is not modified to support encryption or decryption of chaincode arguments or to support encryption or decryption of the state of the blockchain;

writing, by the endorser node, the encrypted state of the blockchain to the shared ledger of the blockchain using the second shim layer;

reading, by the endorser node, the encrypted state of the blockchain from the shared ledger using the second shim layer;

decrypting, by the endorser node, the encrypted state of the blockchain;

endorsing, by the endorser node, a result of executing the chaincode; and sending, by the endorser node, the endorsed result to the blockchain client to create a blockchain transaction.

9. The method of claim 8, wherein the first shim layer provides an application programming interface between the chaincode and the shared ledger.

10. The method of claim 8, wherein the second shim layer is between the chaincode and the first shim layer.

11. The method of claim 10, wherein the writing the encrypted state of the blockchain to the shared ledger further comprises:

sending the encrypted state of the blockchain from the second shim layer to the first shim layer and from the first shim layer to the shared ledger.

12. The method of claim 10, wherein the reading the encrypted state of the blockchain from the shared ledger further comprises:

receiving, by the first shim layer, the encrypted state of the blockchain from the shared ledger and send the encrypted state of the blockchain to the second shim layer from the first shim layer.

13. The method of claim 8, further comprising:

receiving a chaincode deploy transaction proposal from the blockchain client, wherein the chain code deploy transaction proposal comprises a transient field comprising a master key and encrypted deploy arguments.

14. The method of claim 13, wherein the chaincode invoke transaction proposal comprises:

an encryption key derived from the master key, wherein the encryption key is used to encrypt a chaincode argument.

15. A non-transitory computer readable medium comprising one or more instructions that when executed by a processor of an endorser node in a blockchain network cause the processor to perform:

receiving a chaincode invoke transaction proposal from a blockchain client in the blockchain network;

executing chaincode corresponding to the chaincode invoke transaction proposal using a first shim layer between the chaincode and a shared ledger of a blockchain in the blockchain network to process data related to non-encrypted chaincode and a second shim layer to process data related to encrypted chaincode to encrypt a state of the blockchain, wherein the first shim layer is not modified to support encryption or decryption of chaincode arguments or to support encryption or decryption of the state of the blockchain;

writing the encrypted state of the blockchain to the shared ledger of the blockchain using the second shim layer;

reading the encrypted state of the blockchain from the shared ledger using the second shim layer;
decrypting the encrypted state of the blockchain;
endorsing a result of executing the chaincode; and
sending the endorsed result to the blockchain client to create a blockchain transaction.

16. The non-transitory computer-readable medium of claim 15, wherein the first shim layer provides an application programming interface between the chaincode and the shared ledger.

17. The non-transitory computer-readable medium of claim 15, wherein the one or more instructions further cause the processor to perform:
receiving a chaincode deploy transaction proposal from the blockchain client, wherein the chain code deploy transaction proposal comprises a transient field comprising a master key and encrypted deploy arguments.

18. The non-transitory computer-readable medium of claim 17, wherein the chaincode invoke transaction proposal comprises:
an encryption key derived from the master key, wherein the encryption key is used to encrypt a chaincode argument.

19. The non-transitory computer-readable medium of claim 17, wherein the writing the encrypted state of the blockchain to the shared ledger further comprises:
sending the encrypted state of the blockchain from the second shim layer to the first shim layer and from the first shim layer to the shared ledger.

20. The non-transitory computer-readable medium of claim 15, wherein the reading the encrypted state of the blockchain from the shared ledger further comprises:
receiving, by the first shim layer, the encrypted state of the blockchain from the shared ledger and send the encrypted state of the blockchain to the second shim layer from the first shim layer.

* * * * *